M. M. AND W. STEPHENS.
POTATO PICKER.
APPLICATION FILED NOV. 15, 1920.
1,389,789.
Patented Sept. 6, 1921.
2 SHEETS—SHEET 1.
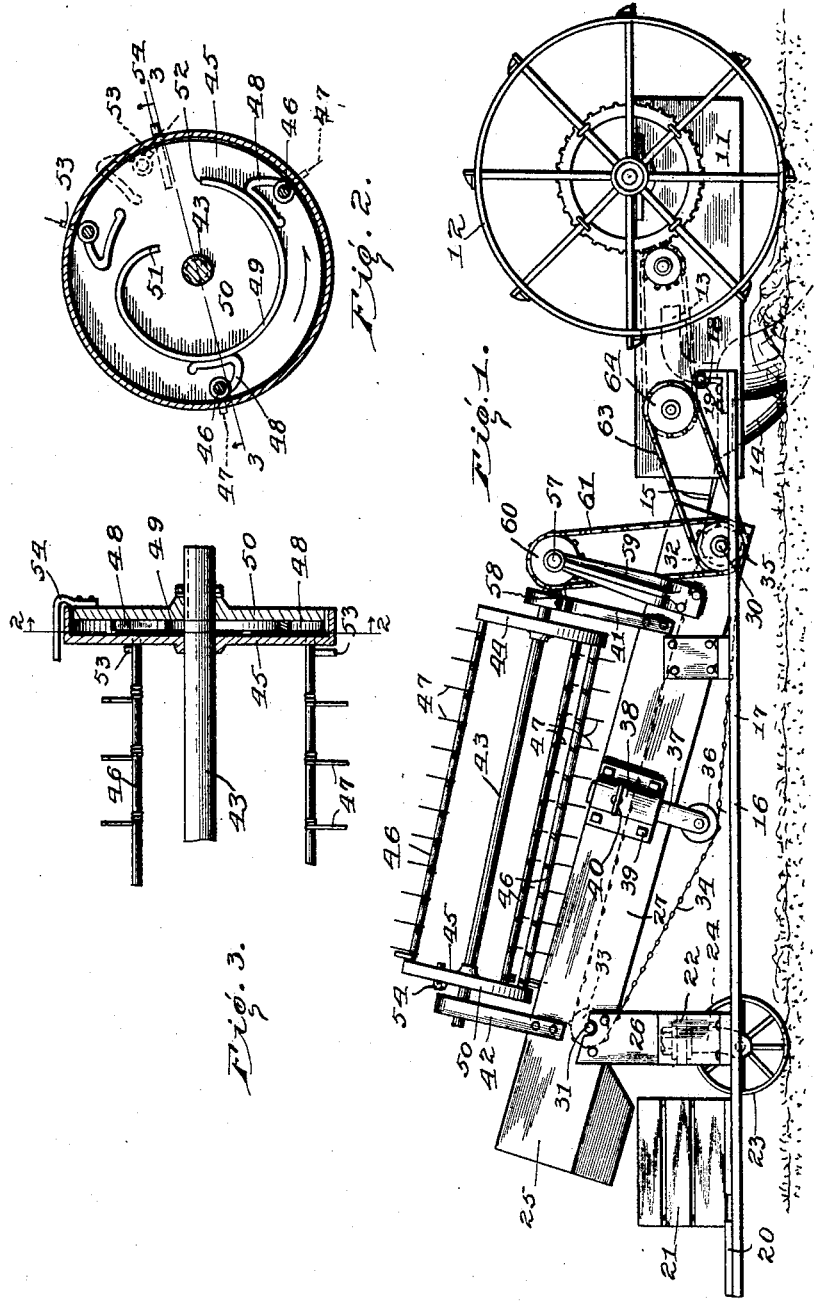

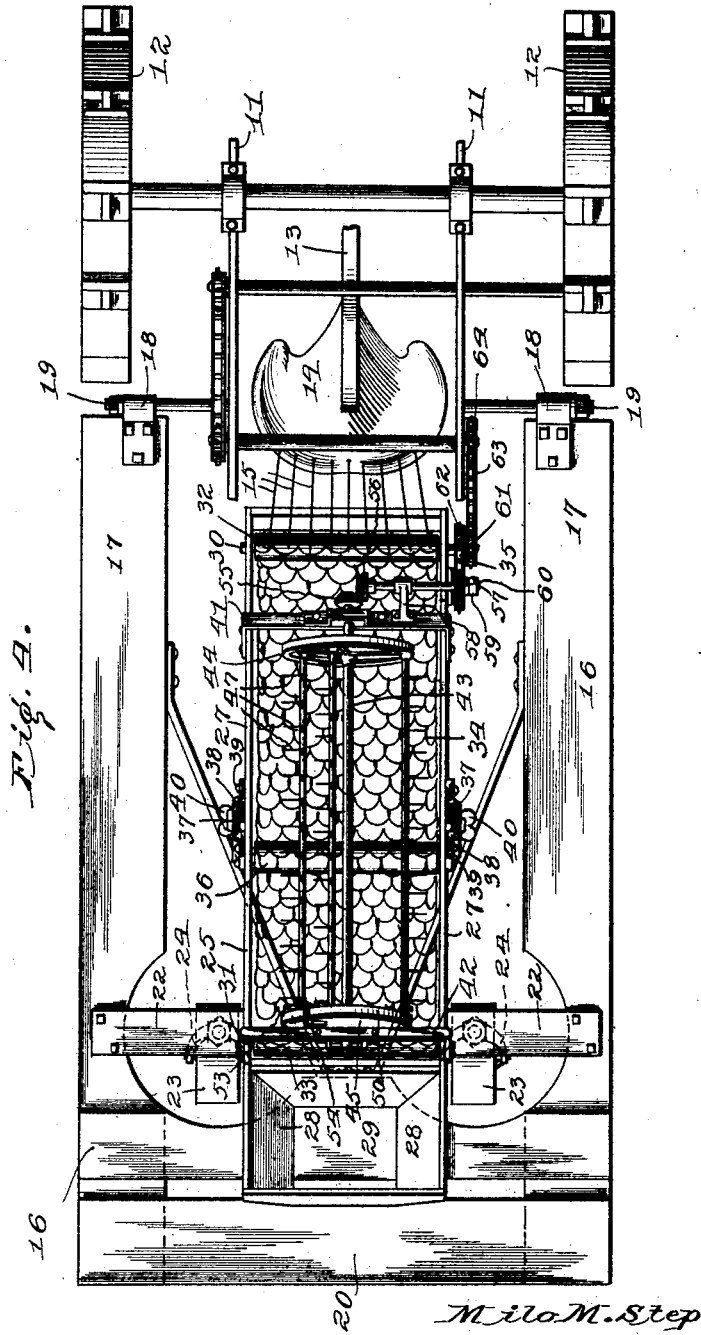

UNITED STATES PATENT OFFICE.

MILO M. STEPHENS AND WILLIAM STEPHENS, OF LAKEVIEW, MICHIGAN.

POTATO-PICKER.

1,389,789.  Specification of Letters Patent.  Patented Sept. 6, 1921.

Application filed November 15, 1920. Serial No. 424,131.

*To all whom it may concern:*

Be it known that we, MILO M. STEPHENS and WILLIAM STEPHENS, citizens of the United States, and residents of Lakeview, county of Montcalm, and State of Michigan, have invented certain new and useful Improvements in Potato-Pickers, of which the following is a specification.

This invention relates to machines for gathering potatoes, separating from them the vines and soil which are dug up with them, and delivering them to a crate or similar receptacle.

One of the objects of the invention is the provision of suitable means for receiving the potatoes as they are dug up and conveying them to the point of delivery to a receptacle, and simple and effective means for separating from them the vines and other material while they are carried by the conveying means. Another object of the invention is the provision, in a machine of this type, of a device which will effectively pick out the vines and similar material and eject them laterally and expedite the separation of other material from the potatoes by gravity. A still further object is the provision of a vine clearing device which will not become clogged in use; still further objects are the provision of a machine of this type which can be readily attached to a digger, and the provision of a simple machine, the operative parts of which can be driven from the digger.

Other objects of the invention and the features of novelty will be apparent from the following specification when taken in connection with the accompanying drawings, in which—Figure 1 is a side elevation of a machine embodying the invention, and of a part of a digger with which it coöperates; Fig. 2 is a transeverse sectional view taken on the line 2—2 of Fig 3; Fig. 3 is a sectional view on the line 3—3 of Fig. 2; and Fig. 4 is a plan view of the structure shown in Fig. 1.

The machines employed for digging potatoes are usually what are commonly known as "riding plows," having a frame supported by wheels and having a standard to which a plow-share is fixed. In Figs. 1 and 4 a potato digger is conventionally shown as having a frame 11 supported by wheels 12 and having a standard 13 on which a plow-share 14 is mounted, guiding fingers 15 extending back from the upper edge of the plow-share 14 and constituting guiding means over which the material dug up by the plow-share is pushed by the forward movement of the digger as a whole. It will be understood that the digger used may be any convenient construction, a detailed description thereof being omitted as it constitutes no part of the present invention.

The potato picking machine comprises a frame 16 which is preferably horizontal and substantially U-shaped having forwardly projecting side members 17 which at their forward ends carry brackets 18 for attachment to the body 11 of the digger by bolts 19, and a transversely extending portion 20 at its rear end which may be widened as desired to conveniently accommodate a crate 21 or a similar receptacle for the potatoes. By making the frame substantially horizontal provision is made for carrying a number of empty crates or those already filled. The side members 17 are connected adjacent their rear ends by a cross member 22 and wheels 23 are carried in yokes 24 which are pivotally secured in the cross member 22 in any convenient manner, so that the frame as a whole is supported on the wheels 23

A conveyer frame 25 is supported on standards 26 on the cross member 22 such frame comprising side members 27 and being closed at its rear end as shown best in Fig. 4 and having inclined portions 28 to provide the relatively small discharge opening 29.

Transversely extending shafts 30 and 31 are journaled at their ends in the side members 27, the shaft 30 being adjacent the forward ends of members 27 and the shaft 31 being positioned adjacent the discharge opening 29. Rollers 32 and 33 are rigidly secured on the shafts 30 and 31 respectively between the side members 27 and upon these rollers a meshed conveyer belt 34 of any particular construction desired, is supported. One end of the shaft 30 is extended outwardly from the side member 27 and is provided with a sprocket wheel 35 by which it may be driven, it being understood that the roller 32 is suitably formed to drive the conveyer belt 34. A tensioning roller 36 is rotatably carried upon the supports 37 which are adjustably carried in the housings 38 which are secured to the side members 27 by bolts 39, or in any other suitable manner, wing nuts 40 being provided to hold the roller 36 in adjusted position.

Brackets 41 and 42 extend upwardly from the side members 27 and carry the vine clearer shaft 43 which is rotatably mounted therein, the bracket 41 being higher than the bracket 42 so that the shaft 43 converges toward the upper stretch of the conveyer 34. Disks 44 and 45 are rigidly secured adjacent the forward and rear ends respectively of the shaft 43 and longitudinally extending members 46 have their ends journaled in the disks 44 and 45 and are each provided with a plurality of resilient fingers 47 which are herein shown as being secured to the longitudinally extending members 46 at one end and then wrapped several times around such members, their free ends extending outwardly from the shaft 43. It will be understood that the disks 44 and 45 together with the longitudinally extending members 46 and the fingers 47 constitute a spindle which is rotatable as a whole, so that the fingers 47 will be caused to sweep laterally through the material which is on the belt 34. In order that the longitudinally extending members 47 may be normally held from independent rotation they are provided adjacent the disk 45 with rigid arms 48 which engage cam 49 on a stationary disk 50 which is rigidly secured to the bracket 42. The cam 49 is circular throughout the greater part of its length but is inclined inwardly as shown at 51 and is broken abruptly as shown at 52 so that as each of the shafts 46 swings about the shaft 43 the fingers 47 will normally extend radially away from the shaft 43, but as each member 46 passes the shoulder 52 it can rotate to the position shown in dotted lines in Fig. 2. This independent rotation of the members 46 enables the fingers 47 to be easily withdrawn from the vines and other material which has been separated from the potatoes on the conveyer, and prevents the machine from being clogged by vines which might otherwise not be discharged. Each of the members 46 is provided adjacent the disk 45 with a rigid finger 53 which extends substantially radially therefrom, and upon the stationary disk 50 a rigid finger 54 is carried, which extends into the path of motion of fingers 53 so that as each member 46 passes the abutment 52 the finger 53 will engage the finger 54 and the member 46 will be positively rotated to the dotted line position shown in Fig. 2.

The forward end of shaft 43 is provided with a bevel pinion 55, with which a pinion 56 carried by a transverse shaft 57 meshes. The shaft 57 is rotatably mounted in a bracket 58 supported on the bracket 41 and in a standard 59 which extends upwardly from one of the side members 27. Adjacent to its outer end the shaft 57 is provided with a sprocket wheel 60 which is driven by a sprocket chain 61 from the sprocket wheel 62 on the shaft 30 of the conveyer. The shaft 30 of the conveyer is driven by a sprocket chain 63 which is connected to the sprocket 35 on the shaft 30 and to a sprocket 64 on the frame 11 of the digger, the sprocket 64 being driven in any desired manner by the forward movement of the digger.

In the operation of the device the potatoes and other material dug up by the plow-share 14 will be forced upwardly and rearwardly and received upon the conveyer belt 34. As this material moves upwardly and rearwardly on the upper stretch of the conveyer belt the fingers 47 will be moved laterally through such material and will clear out the vines and similar material, at the same time stirring the soil and potatoes so as to facilitate the separation of the soil and small stones which will drop by gravity through the openings in the conveyer. The fingers 47 adjacent the discharge end of the conveyer pass more closely to the conveyer, such construction insuring that all of the vines will be cleared away and that the potatoes will be cleaned by being tumbled about upon the conveyer. The potatoes upon reaching the discharge end of the conveyer where it passes over the roller 33 fall by gravity through the discharge opening 29 into the receptacle 21 and the frame 16, as stated, is preferably so formed as to accommodate a number of empty or filled receptacles.

One embodiment of the invention having been thus specifically described, it will be understood that changes may be made in the details of the construction without departing from the spirit of the invention which is defined in the following claims.

The invention having been thus described what is claimed is:

1. In a separating machine, the combination of a frame, a conveyer carried by said frame, a vine clearer carried by said frame above said conveyer including fingers movable through the material while it is on said conveyer at right angles to the direction in which it is being conveyed, and means for operating said conveyer and said vine clearer.

2. In a separating machine, the combination of a frame, a conveyer carried by said frame, a vine clearer carried by said frame above said conveyer comprising fingers movable laterally through the material on said conveyer, those fingers adjacent the delivery end of said conveyer being arranged to extend nearer to the conveyer than do those adjacent the receiving end of the conveyer, and means for operating said conveyer and said vine clearer.

3. In a separating machine, the combination of a frame, a conveyer carried by said frame, a vine clearer above said conveyer comprising a spindle rotatable about a longitudinal axis and converging toward said conveyer and a plurality of resilient fingers carried by said spindle, and means for operating said conveyer and said spindle.

4. In a separating machine, the combination of a frame, means carried by said frame for guiding the material to be separated, a vine clearer rotatably mounted over said means on an axis extending in the direction of motion of the material and comprising longitudinally extending members and resilient fingers carried by said members, means for rotating said members about a common axis and means for preventing independent rotation of said members while the fingers thereon are passing through the material but permitting independent rotation thereof after the fingers have passed through the material.

5. In a separating machine, the combination of a frame, means carried by said frame for guiding the material to be separated, a vine clearer mounted over said means and rotatable about an axis extending substantially in the direction of motion of the material, said vine clearer comprising a head, a longitudinally extending member positioned eccentrically thereof and a plurality of resilient fingers carried by said member, means for rotating said head, means holding said member from independent rotation while the fingers thereon are passing through the material, and means for independently rotating said member after the fingers thereon have passed through the material.

6. In a separator, the combination of means for guiding the material to be separated, a vine clearer mounted over said means and comprising a head rotatable about an axis extending substantially in the direction of motion of the material, a longitudinally extending member carried eccentrically by said head and having a plurality of resilient fingers thereon, means for rotating said head, and means for rotating said member in the direction opposite to the direction of rotation of said head, during part of its rotation with said head.

7. In a separating machine, the combination of a frame for attachment to a digger, a conveyer carried by said frame for receiving the material as it is dug up, a vine clearer supported by the frame above the conveyer and including resilient fingers movable through the material at right angles to the direction in which it is being conveyed, means for operating the vine clearer and means for operating the conveyer.

8. In a separating machine, the combination of a frame, means for guiding the material to be separated, a vine clearer rotatably carried by said frame above said conveyer, said vine clearer comprising a central shaft, end members rigid with said shaft, a plurality of longitudinally extending members journaled in said end members and spaced from said shaft, and resilient fingers carried by said longitudinally extending members, means for rotating said longitudinally extending members about said shaft and means on said longitudinally extending members and one of said heads for independently rotating each of said longitudinally extending members partially at one point of its motion about said shaft.

In testimony whereof, we have hereunto affixed our signatures.

MILO M. STEPHENS.
WILLIAM STEPHENS.